(12) United States Patent
Yamazaki et al.

(10) Patent No.: US 9,960,892 B2
(45) Date of Patent: May 1, 2018

(54) BASE STATION AND CONTROL METHOD THEREOF

(75) Inventors: Chiharu Yamazaki, Tokyo (JP); Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 61 days.

(21) Appl. No.: 14/113,789

(22) PCT Filed: Apr. 26, 2012

(86) PCT No.: PCT/JP2012/061277
§ 371 (c)(1),
(2), (4) Date: Oct. 24, 2013

(87) PCT Pub. No.: WO2012/147883
PCT Pub. Date: Nov. 1, 2012

(65) Prior Publication Data
US 2014/0044087 A1    Feb. 13, 2014

(30) Foreign Application Priority Data

Apr. 26, 2011    (JP) .................................. 2011-098824

(51) Int. Cl.
*H04L 5/00*    (2006.01)
*H04W 48/02*    (2009.01)
(Continued)

(52) U.S. Cl.
CPC .......... *H04L 5/0037* (2013.01); *H04L 5/0098* (2013.01); *H04W 48/02* (2013.01);
(Continued)

(58) Field of Classification Search
CPC ..... H04L 5/001; H04L 5/0053; H04L 5/0055; H04L 5/0073; H04L 5/0098; H04W 92/20; H04W 48/02
See application file for complete search history.

(56) References Cited

U.S. PATENT DOCUMENTS

2012/0099441 A1    4/2012  Jung et al.
2012/0108283 A1*   5/2012  Pedersen et al. ............. 455/509
(Continued)

FOREIGN PATENT DOCUMENTS

WO    WO 2010136073 A1 * 12/2010
WO    2011/008002 A2     1/2011
WO    WO 2011021595 A1 *  2/2011    ........ H04W 36/0072

OTHER PUBLICATIONS

The extended European search report issued by the European Patent Office dated Sep. 15, 2014, which corresponds to European Patent Application No. 12777693.8-1851 and is related to U.S. Appl. No. 14/113,789.

(Continued)

*Primary Examiner* — Ian N Moore
*Assistant Examiner* — Brian T Le
(74) *Attorney, Agent, or Firm* — Studebaker & Brackett PC

(57) ABSTRACT

A macro base station MeNB in a mobile communication system that supports a carrier aggregation technology defined in a 3GPP standard, communicates with a pico base station PeNB #1 via an X2 interface. The macro base station MeNB transmits information to the pico base station PeNB the information being used when the pico base station PeNB determines a component carrier requested to be limitedly used by the macro base station MeNB or a component carrier requested to be released from use limitation by the macro base station MeNB.

2 Claims, 9 Drawing Sheets

(51) Int. Cl.
H04W 52/02 (2009.01)
H04W 72/04 (2009.01)
H04W 92/20 (2009.01)
H04W 84/04 (2009.01)
H04W 76/06 (2009.01)
H04W 88/08 (2009.01)
H04W 52/24 (2009.01)

(52) U.S. Cl.
CPC ... H04W 52/0206 (2013.01); H04W 72/0426 (2013.01); *H04L 5/001* (2013.01); *H04L 5/0035* (2013.01); *H04L 5/0044* (2013.01); *H04W 52/244* (2013.01); *H04W 72/0453* (2013.01); *H04W 76/064* (2013.01); *H04W 84/045* (2013.01); *H04W 88/08* (2013.01); *H04W 92/20* (2013.01); *Y02B 60/50* (2013.01)

(56) References Cited

U.S. PATENT DOCUMENTS

| | | | | |
|---|---|---|---|---|
| 2012/0142354 | A1* | 6/2012 | Ahluwalia | ..................... 455/436 |
| 2012/0213123 | A1* | 8/2012 | Futaki | ..................... H04L 5/001 |
| | | | | 370/254 |

OTHER PUBLICATIONS

Communication pursuant to Rules 70(2) and 70a(2) EPC issued by the European Patent Office dated Oct. 2, 2014, which corresponds to European Patent Application No. 12777693.8-1851 and is related to U.S. Appl. No. 14/113,789.

HTC; "Corrections on Carrier Aggregation in 36.300"; 3GPP TSG-RAN WG2 Meeting #72; R2-106592; Nov. 15-19, 2010; Jacksonville, FL, USA.

Motorola; "[70#11] LTE CA: S-cell activation status after handover"; 3GPP TSG-RAN WG2#70bis; R2-103912; Jun. 28-Jul. 2, 2010; Stockholm, Sweden.

NTT DOCOMO; "Downlink Interference Coordination Between eNodeB and Home eNodeB"; 3GPP TSG-RAN Working Group 4 (Radio) meeting #52; R4-093203; Aug. 24-28, 2009; Shenzhen, China.

TSG-RAN Working Group 4 (Radio) meeting #52; NTT DOCOMO; Downlink Interference Coordination Between eNodeB and Home eNodeB; Shenzhen, China; Aug. 24-28, 2009; pp. 1-5; R4-093203.

3GPP TSG-RAN WG3 #63-bis; Ericsson; Support for carrier aggregation; Seoul, South Korea; Mar. 23-26 2009; pp. 1-2; Tdoc R3-090920.

3GPP TSG-RAN WG4 Meeting #52bis; CMCC; Summary of HeNB interference management methods based on different interference scenarios; Miyazaki, Japan; Oct. 12-16, 2009; pp. 1-7; R4-093611.

3GPP TS 36.300 V10.3.0 (Mar. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 2); pp. 1-197.

International Search Report; PCT/JP2012/061277; dated Jun. 19, 2012.

An Office Action issued by the Korean Patent Office dated Feb. 10, 2015, which corresponds to Korean Patent Application No. 10-2013-7027854 and is related to U.S. Appl. No. 14/113,789; with English language concise explanation.

3GPP; "LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)", ETSI TS 136 300; Jan. 2011; pp. 1-207; v10.2.0; France.

An Office Action; "Notice of Reasons for Rejection," issued by the Japanese Patent Office dated Nov. 25, 2014, which corresponds to Japanese Patent Application No. 2014-207196 and is related to U.S. Appl. No. 14/113,789; with English language statement of relevance.

Nokia Siemens Networks; "Carrier Based ICIC for Inter-Site CA Optimization"; Feb. 6-10, 2011; 3GPP TSG-RAN WG3 Meeting #75; R3-120283; Dresden, Germany.

Nokia et al.; "Baseline simulations assumptions for measurements of deactivated carriers"; Jun. 28-Jul. 2, 2010; 3GPP TSG-RAN WG4 Ad Hoc meeting #10-03; R4-102730; Bratislava, Slovakia.

The extended European search report issued by the European Patent Office dated Dec. 6, 2017, which corresponds to EP17190274.5-1875 and is related to U.S. Appl. No. 14/113,789.

Nokia Siemens Networks et al., "Inter eNB over-the-air communication (OTAC) for LTE-Advanced", 3GPP TSG RAN WG1 #57 Meeting, May 4-8, 2009, p. 1-6, R1-091777, San Francisco, USA.

Alcatel-Lucent Shanghai Bell et al., "Almost Blank Subframe Request from Pico to Macro eNB", 3GPP TSG RAN WG3 #70 Meeting, Nov. 15-19, 2010, p. 1-2, R3-103336, Jacksonville, USA.

* cited by examiner

FIG. 5
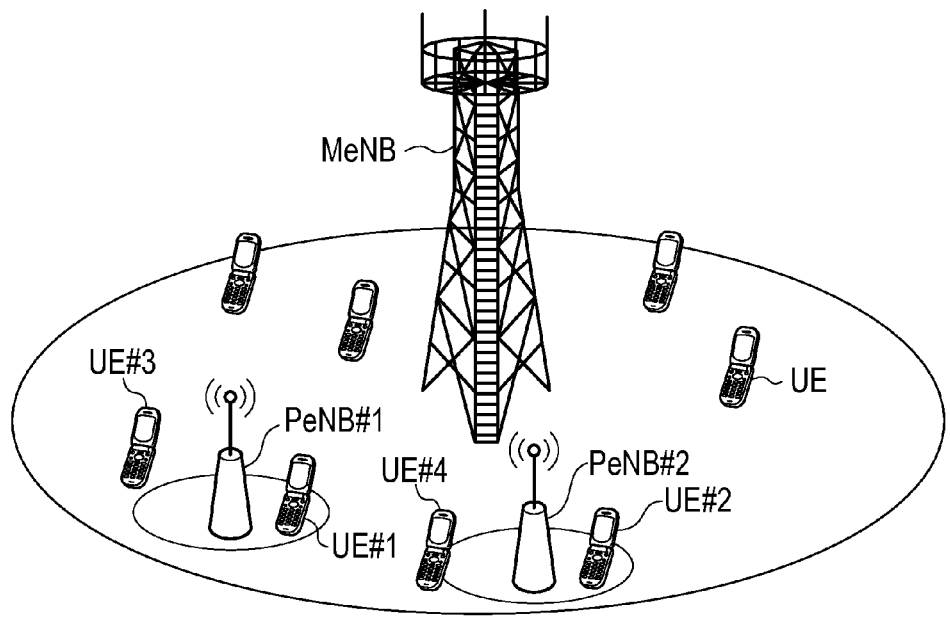
FIG. 6
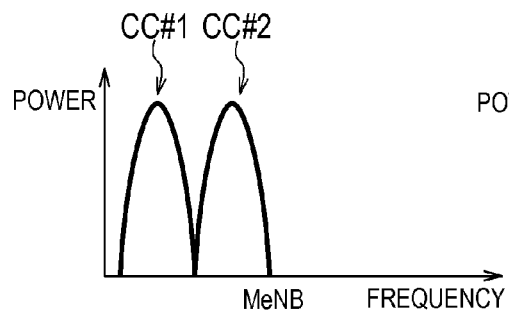
(a) SUSPENSION OF USE OF CCS#3 AND #4
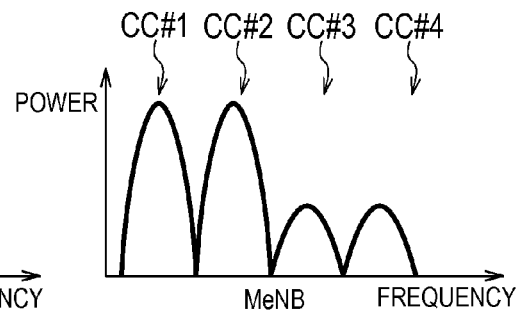
(b) TRANSMISSION POWER REDUCTION OF CCS#3 AND #4

BASE STATION AND CONTROL METHOD THEREOF

TECHNICAL FIELD

The present invention relates to a base station in a mobile communication system that supports a carrier aggregation technology and a control method thereof.

BACKGROUND ART

As the next-generation mobile communication system for achieving high speed communication with high capacity, standardization of LTE Advanced obtained by sophisticating LTE (Long Term Evolution) has been in progress in 3GPP (3rd Generation Partnership Project) that is a standardization group.

In order to achieve to widen a band while ensuring backward compatibility with LTE, LTE Advanced introduces a carrier aggregation technology in which a carrier (a frequency band) of LTE is positioned as a component carrier, and a plurality of component carriers are collectively used to perform radio communication (for example, see Non Patent Literature 1).

CITATION LIST

Non Patent Literature

Non Patent Literature 1: 3GPP Technical Specification TS 36.300 V10.3.0, "5.5 Carrier Aggregation"

SUMMARY OF THE INVENTION

Meanwhile, in LTE Advanced, it is widely discussed to reduce interference in the aforementioned carrier aggregation technology.

Therefore, an object of the present invention is to solve the aforementioned problems in a mobile communication system that supports a carrier aggregation technology defined in 3GPP standard.

To solve the aforementioned problem, the present invention has following features.

The feature of a base station according to the present invention is summarized as follows. A base station (for example, a macro base station MeNB) in a mobile communication system that supports a carrier aggregation technology defined in a 3GPP standard, transmits information to another base station (for example, a pico base station PeNB #1) on an X2 interface or an S1 interface, the information being used when the other base station determines a component carrier requested to be limitedly used by the base station or a component carrier requested to be released from use limitation by the base station.

The feature of a base station according to the present invention is summarized as follows. A base station (for example, a pico base station PeNB #1) in a mobile communication system that supports a carrier aggregation technology defined in a 3GPP standard, receives information from another base station (for example, a macro base station MeNB) on an X2 interface or an S1 interface, the information being used when the base station determines a component carrier requested to be limitedly used by the other base station or a component carrier requested to be released from use limitation by the other base station.

The feature of a control method according to the present invention is summarized as follows. A method of controlling a base station in a mobile communication system that supports a carrier aggregation technology defined in a 3GPP standard, includes: a step of transmitting information to another base station on an X2 interface or an S1 interface, the information being used when the other base station determines a component carrier requested to be limitedly used by the base station or a component carrier requested to be released from use limitation by the base station.

The feature of a control method according to the present invention is summarized as follows. A method of controlling a base station in a mobile communication system that supports a carrier aggregation technology defined in a 3GPP standard, includes: a step of receiving information from another base station on an X2 interface or an S1 interface, the information being used when the base station determines a component carrier requested to be limitedly used by the other base station or a component carrier requested to be released from use limitation by the other base station.

BRIEF DESCRIPTION OF THE DRAWINGS

FIG. 5 is a diagram for explaining the operation overview of the mobile communication system according to the embodiment of the present invention.

FIG. 6(a) is a diagram for explaining a case in which the macro base station suspends using some of the component carriers CC #1 to CC #4. FIG. 6(b) is a diagram for explaining the case in which the macro base station reduces the transmission power of some of the component carriers to be smaller than predetermined power.

DESCRIPTION OF THE EMBODIMENT

Figure 1:
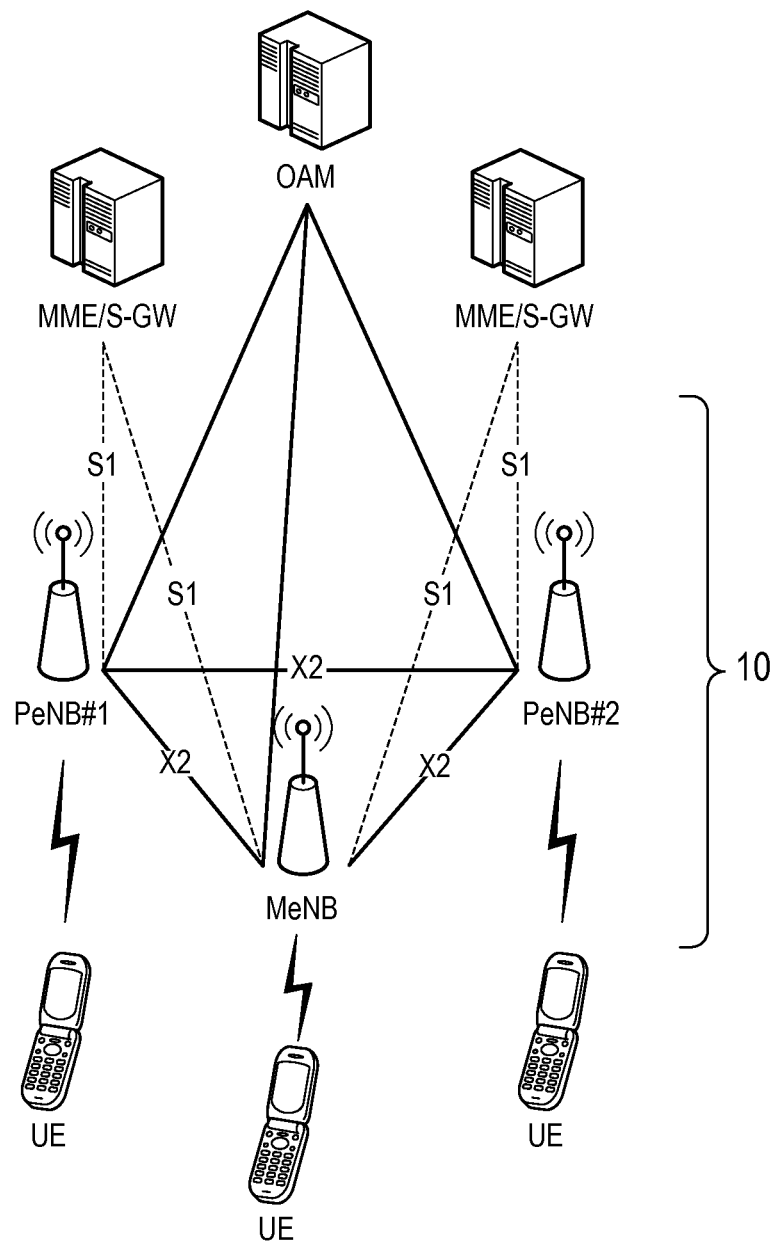
FIG. 1 is a diagram showing an entire configuration of a mobile communication system according to the embodiment of the present invention.

With reference to the drawings, the embodiment of the present invention will be described in the order of (1) Configuration of mobile communication system, (2) Operation of mobile communication system, (3) Effect of embodiment and (4) Other embodiments. In the drawings of the following embodiment, the same or similar reference signs are applied to the same or similar portions.

(1) Configuration of Mobile Communication System (1.1) Entire Configuration

FIG. 1 is a diagram showing an entire configuration of a mobile communication system 1 according to the present embodiment. The mobile communication system 1 according to the present embodiment is configured on the basis of LTE Advanced (after 3GPP Release 10).

As illustrated in FIG. 1, the mobile communication system 1 includes E-UTRAN (Evolved-UMTS Terrestrial Radio Access Network) 10 that is a radio access network. The E-UTRAN 10 is configured as a heterogeneous network, and includes a plurality of types of base stations with different transmission power (that is, service area ranges).

The heterogeneous network is for effectively arranging not only a low power base station (for example, a pico base station or a femto base station) with a small service area range but also a high power base station (that is, a macro base station). Note that the heterogeneous network is capable of dispersing a load of the high power base station to the low power base station; however, there is a problem that the low power base station is influenced by interference from the high power base station, resulting in deterioration of communication quality due to such inter-base station interference.

In the present embodiment, the E-UTRAN 10 includes a macro base station MeNB that forms a large cell (a macro cell) and two pico base stations PeNB (PeNB #1 and PeNB #2) that form small cells (pico cells).

The pico base stations PeNB #1 and PeNB #2, for example, are within the service area of the macro base station MeNB, and are arranged in a high traffic zone (that is, a hot zone). Note that the number of the pico base stations PeNB arranged within the service area of the macro base station MeNB is not limited to two, and may be one or three or more.

The service area range of the macro base station MeNB is covered by a plurality of cells formed by the macro base station MeNB. Similarly, a service area range of the pico base station PeNB #1 is covered by a plurality of cells formed by the pico base station PeNB #1, and a service area range of the pico base station PeNB #2 is covered by a plurality of cells formed by the pico base station PeNB #2. Furthermore, the cell is a minimum unit of a radio communication area.

Each of the macro base station MeNB, the pico base station PeNB #1, and the pico base station PeNB #2 supports the aforementioned carrier aggregation technology. In the present embodiment, one cell corresponds to one component carrier.

One or a plurality of radio terminals UE are connected to each of the macro base station MeNB, the pico base station PeNB #1, and the pico base station PeNB #2. The radio terminal UE supporting the carrier aggregation technology is capable of collectively using a plurality of component carriers for the purpose of radio communication. In other words, the radio terminal UE supporting the carrier aggregation technology is capable of simultaneously performing radio communication with a plurality of serving cells.

In the mobile communication system 1, an X2 interface for connecting (mutually adjacent) base stations to each other is set. In the present embodiment, the X2 interfaces are set between the macro base station MeNB and the pico base station PeNB #1, between the macro base station MeNB and the pico base station PeNB #2, and between the pico base station PeNB #1 and the pico base station PeNB #2, respectively.

Moreover, the mobile communication system 1 includes a mobility management device MME/a gateway device S-GW and an operation administration and maintenance device OAM. The mobility management device MME is configured to perform various types of mobility control for the radio terminal UE. The gateway device S-GW is configured to perform transfer control of user data transmitted from and received by the radio terminal UE. The operation administration and maintenance device OAM is configured to perform maintenance and monitoring of the E-UTRAN 10. Between each base station eNB and EPC (the mobility management device MME/the gateway device S-GW), an S1 interface for connecting each base station eNB to the EPC is set.

(1.2) Configuration of Component Carrier

Next, the configuration of a component carrier that is used in the mobile communication system 1 will be described.

Figure 2:
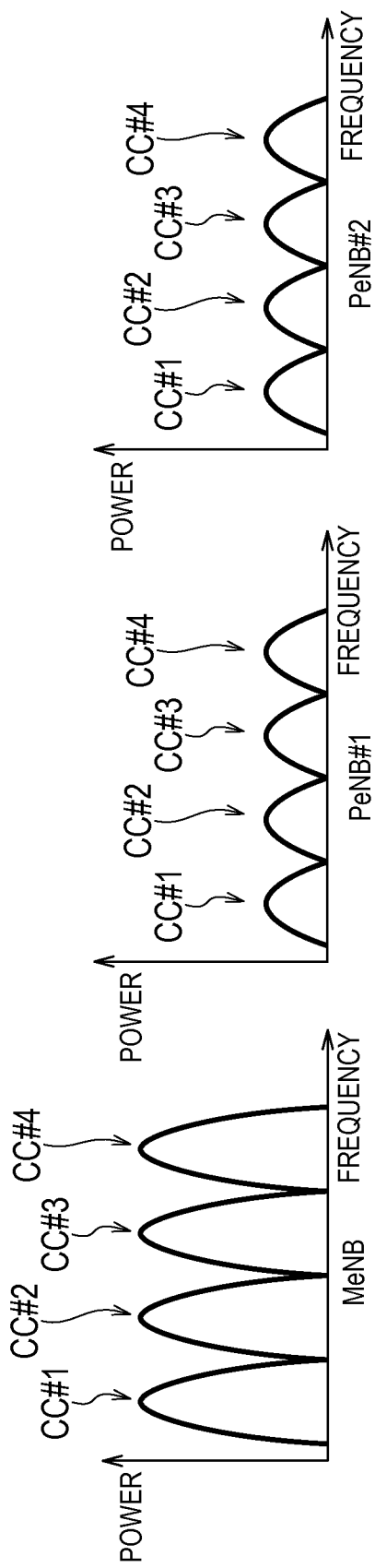
FIG. 2 is a diagram for explaining the configuration of a component carrier that is used in the mobile communication system according to the embodiment of the present invention.

FIG. 2 is a diagram for explaining the configuration of a component carrier that is used in the mobile communication system 1. Hereinafter, the case, in which the number of component carriers is four, will be described. However, the number of the component carriers may be two or three, or five or more. Furthermore, the case, in which a plurality of component carriers are continuous in a frequency direction, will be described. However, each of the component carriers may be dispersed in the frequency direction. For example, the component carriers may be dispersed in an 800 MHz band and a 1.5 GHz band.

As illustrated in FIG. 2, each of the macro base station MeNB, the pico base station PeNB #1, and the pico base station PeNB #2 is capable of using four component carriers CC #1 to CC #4. Each of the component carriers CC #1 to CC #4 corresponds to a carrier (a frequency band) of LTE. That is, each of the component carriers CC #1 to CC #4 includes a plurality of resource blocks (RB) in the frequency direction. Furthermore, the resource block is a unit of a radio resource that is assigned to the radio terminal UE.

For the purpose of convenience, power of each component carrier illustrated in FIG. 2 indicates base station transmission power of each component carrier when downlink carrier aggregation is configured. As illustrated in FIG. 2, the transmission power of each component carrier of each of the pico base stations PeNB #1 and PeNB #2 is lower than the transmission power of each component carrier of the macro base station MeNB.

For this reason, each radio terminal UE connected to each of the pico base stations PeNB #1 and PeNB #2 is influenced by interference from the macro base station MeNB in each component carrier. Furthermore, since a radio terminal UE generally connects to (or waits for) a base station for which reception power in the radio terminal UE is the highest, a radio terminal UE located in the vicinity of the pico base station PeNB #1 or the pico base station PeNB #2 may also connect to the macro base station MeNB.

In the present embodiment, in order to solve such a problem, the macro base station MeNB, the pico base station PeNB #1, and the pico base station PeNB #2 perform inter-base station interference control in units of component carriers in cooperation with one another. Details of such inter-base station interference control will be described later.

(1.3) Configuration of Macro Base Station

Figure 3:
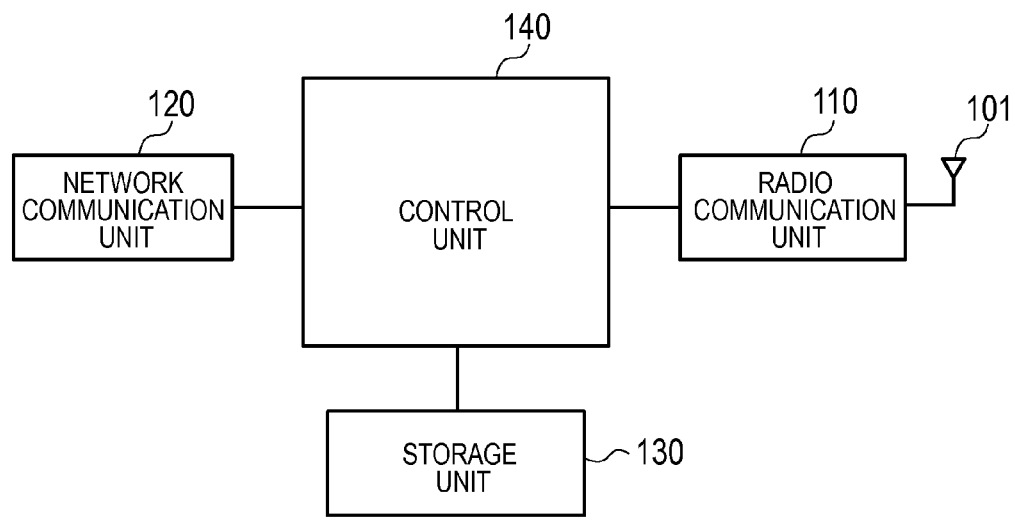
FIG. 3 is a block configuration diagram of the macro base station according to the embodiment of the present invention.

Next, the configuration of the macro base station MeNB will be described. FIG. 3 is a block configuration diagram of the macro base station MeNB.

As illustrated in FIG. 3, the macro base station MeNB includes an antenna 101, a radio communication unit 110, a network communication unit 120, a storage unit 130, and a control unit 140.

The antenna 101 is configured using one or a plurality of antenna elements, and is used for transmitting and receiving a radio signal.

The radio communication unit 110 is configured to perform radio communication by simultaneously using a plurality of component carriers. Specifically, the radio communication unit 110, for example, is configured using a radio frequency (RF) circuit, a baseband (BB) circuit and the like, and transmits and receives a radio signal via the antenna 101 in each component carrier.

For transmission, the radio communication unit 110 performs coding and modulation of a transmitted signal, which is input from the control unit 140, performs up-conversion and amplification thereof, and then outputs the transmitted signal to the antenna 101 in each component carrier. For reception, the radio communication unit 110 performs amplification and down-conversion of a received signal, which is input from the antenna 101, performs demodulation and decoding thereof, and outputs the received signal to the control unit 140 in each component carrier.

The network communication unit 120 performs inter-base station communication with a neighboring base station (the pico base stations PeNB #1 and PeNB #2 in the present embodiment) via the X2 interface. Furthermore, the network communication unit 120 performs communication with a core network (that is, the mobility management device MME, the gateway device S-GW, and the operation administration and maintenance device OAM) via the S1 interface.

The storage unit 130 is configured using, for example, a memory, and stores various types of information that is used for control and the like of the macro base station MeNB. In the present embodiment, the storage unit 130 stores identification information (a cell ID) of each cell formed by the pico base station PeNB #1 and identification information (a base station ID) of the pico base station PeNB #1 to be associated with each other. Furthermore, the storage unit 130 stores identification information (a cell ID) of each cell formed by the pico base station PeNB #2 and identification information (a base station ID) of the pico base station PeNB #2 to be associated with each other. As described above, since component carriers differ in each cell, it is possible to identify the component carriers by the cell ID.

The control unit 140 is configured using, for example, a CPU, and controls various functions provided in the macro base station MeNB. In the present embodiment, the control unit 140 is configured to perform inter-base station interference control in units of component carriers in cooperation with the pico base stations PeNB #1 and PeNB #2.

(1.4) Configuration of Pico Base Station

Figure 4:
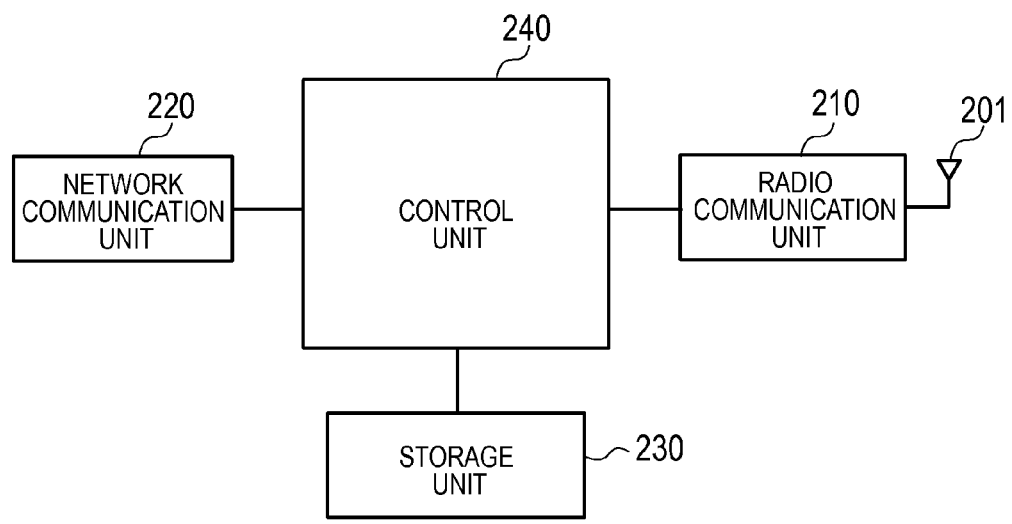
FIG. 4 is a block configuration diagram of the pico base station according to the embodiment of the present invention.

Next, the configuration of the pico base station PeNB #1 will be described. FIG. 4 is a block configuration diagram of the pico base station PeNB #1. Since the pico base station PeNB #2 has the same configuration as that of the pico base station PeNB #1, a description for the configuration of the pico base station PeNB #2 will be omitted.

As illustrated in FIG. 4, the pico base station PeNB #1 includes an antenna 201, a radio communication unit 210, a network communication unit 220, a storage unit 230, and a control unit 240.

The antenna 201 is configured using one or a plurality of antenna elements, and is used for transmitting and receiving a radio signal.

The radio communication unit 210 is configured to perform radio communication by simultaneously using a plurality of component carriers. Specifically, the radio communication unit 210 is configured using, for example, a radio frequency (RF) circuit, a baseband (BB) circuit and the like, and transmits and receives a radio signal via the antenna 201 in each component carrier.

For transmission, the radio communication unit 210 performs coding and modulation of a transmitted signal, which is input from the control unit 240, performs up-conversion and amplification thereof, and then outputs the transmitted signal to the antenna 201 in each component carrier. For reception, the radio communication unit 210 performs amplification and down-conversion of a reception signal, which is input from the antenna 201, performs demodulation and decoding thereof, and outputs the reception signal to the control unit 240 in each component carrier.

The network communication unit 220 performs inter-base station communication with a neighboring base station (the macro base station MeNB and the pico base station PeNB #2 in the present embodiment) via the X2 interface. Furthermore, the network communication unit 220 performs communication with a core network (that is, the mobility management device MME, the gateway device S-GW, and the operation administration and maintenance device OAM) via the S1 interface.

The storage unit 230 is configured using, for example, a memory, and stores various types of information that is used for control and the like of the pico base station PeNB #1. In the present embodiment, the storage unit 230 stores identification information (a cell ID) of each cell formed by the macro base station MeNB and identification information (a base station ID) of the macro base station MeNB to be associated with each other. As described above, since component carriers differ in each cell, it is possible to identify the component carriers by the cell ID.

The control unit 240 is configured using, for example, a CPU, and controls various functions provided in the pico base station PeNB #1. In the present embodiment, the control unit 240 is configured to perform inter-base station interference control in units of component carriers in cooperation with the macro base station MeNB.

(2) Operation of Mobile Communication System

(2.1) Operation Overview

Next, with reference to FIG. 5 and FIG. 6, the operation overview of the mobile communication system 1 will be described. FIG. 5 is a diagram for explaining the operation overview of the mobile communication system 1.

As illustrated in FIG. 5, the pico base stations PeNB #1 and PeNB #2 are arranged within the service area of the macro base station MeNB. Furthermore, among a plurality of radio terminals UE located within the service area of the macro base station MeNB, a radio terminal UE #1 is connected to the pico base station PeNB #1, a radio terminal UE #2 is connected to the pico base station PeNB #2, and other radio terminals UE are connected to the macro base station MeNB.

As described above, each radio terminal UE connected to each of the pico base stations PeNB #1 and PeNB #2 is influenced by interference from the macro base station MeNB in each component carrier, resulting in the deterioration of communication quality. Furthermore, since a radio terminal UE #3 located in the vicinity of the pico base station PeNB #1 and a radio terminal UE #4 located in the vicinity of the pico base station PeNB #2 are connected to the macro base station MeNB, it is not possible to disperse a load of the macro base station MeNB.

For this reason, the macro base station MeNB suspends using some of the component carriers CC #1 to CC #4 or reduces the transmission power of the some component carriers according to the situation within the service area of the macro base station MeNB.

FIG. 6(a) is a diagram for explaining a case in which the macro base station MeNB suspends using some of the component carriers CC #1 to CC #4. As illustrated in FIG. 6(a), the macro base station MeNB suspends using the component carriers CC #3 and CC #4, so that each of the pico base stations PeNB #1 and PeNB #2 avoids the influence of interference from the macro base station MeNB in the component carriers CC #3 and CC #4.

FIG. 6(b) is a diagram for explaining the case in which the macro base station MeNB reduces the transmission power of some of the component carriers CC #1 to CC #4 to be smaller than predetermined power. As illustrated in FIG. 6(b), when the macro base station MeNB reduces the transmission power of the component carriers CC #3 and CC #4 to be smaller than the predetermined power, the influence of interference in each of the pico base stations PeNB #1 and PeNB #2 from the macro base station MeNB in the component carriers CC #3 and CC #4 is reduced.

As a consequence, it is possible to improve the communication quality of the radio terminal UE #1 connected to the pico base station PeNB #1 and the communication quality of the radio terminal UE #2 connected to the pico base station PeNB #2, and it is possible to increase the probability that the radio terminal UE #3 located in the vicinity of the pico base station PeNB #1 connects to the pico base station PeNB #1 and the probability that the radio terminal UE #4 located in the vicinity of the pico base station PeNB #2 connects to the pico base station PeNB #2.

The macro base station MeNB and the pico base stations PeNB (PeNB #1 and PeNB #2) exchange information related to such component carrier control, so that it is possible to avoid a problem due to the suspension of use (or the transmission power reduction) of component carriers by the macro base station MeNB, and to increase the improvement effect obtained by the suspension of use (or the transmission power reduction) of the component carriers.

(2.2) Operation Sequence

Hereinafter, the operation sequence of the mobile communication system 1 will be described while focusing on inter-base station signaling between the macro base station MeNB and the pico base stations PeNB (PeNB #1 and PeNB #2).

Figure 7:
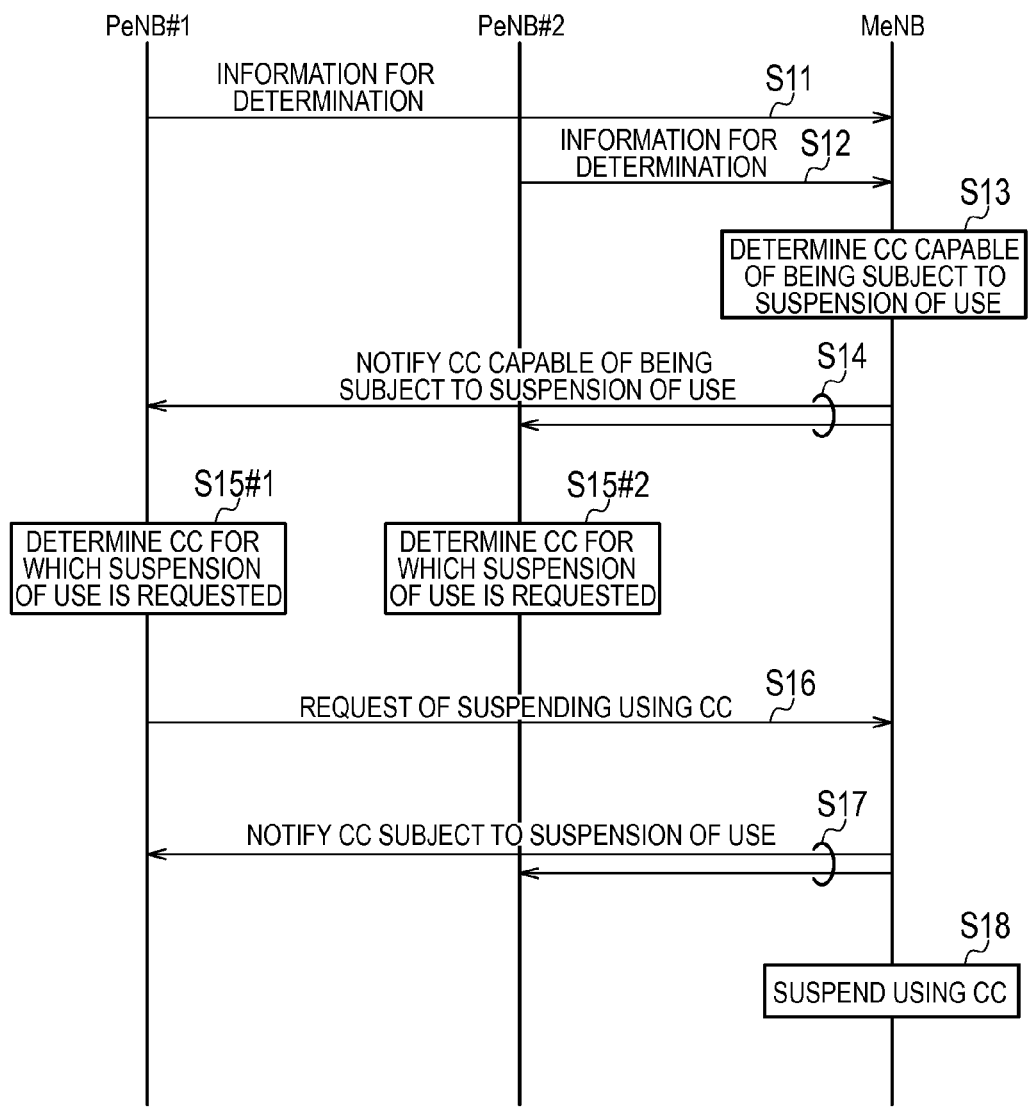
FIG. 7 is an operation sequence diagram of the mobile communication system related to the suspension of use of the component carriers according to the embodiment of the present invention.

Firstly, the operation sequence of the mobile communication system 1 related to the suspension of use of component carriers will be described. FIG. 7 is an operation sequence diagram of the mobile communication system 1 related to the suspension of use of the component carriers.

As illustrated in FIG. 7, in step S11, the pico base station PeNB #1 transmits information to the macro base station MeNB via the X2 interface, wherein the information is used for determining a component carrier that is subject to suspension of use by the macro base station MeNB. The macro base station MeNB receives the information.

Furthermore, as the information for determining the component carrier subject to suspension of use by the macro base station MeNB, for example, it is possible to use at least one item of the following first information to fifth information.

The first information is information indicating a component carrier available by a radio terminal UE supporting no carrier aggregation technology from among each of the radio terminals UE located within the service area of the pico base station PeNB #1 (or connected to the pico base station PeNB #1), or a component carrier not available by the radio terminal UE supporting no carrier aggregation technology. For example, if the macro base station MeNB suspends using the component carrier available by the radio terminal UE, since there is a problem that the radio terminal UE is not able to perform handover (or cell reselection) to the macro base station MeNB from the pico base station PeNB #1, it is effective to notify the macro base station MeNB of the information in order to prevent the problem.

The second information is information indicating a band available by a radio terminal UE having a limited available band (frequency band) from among each of the radio terminals UE located within the service area of the pico base station PeNB #1 (or connected to the pico base station PeNB #1), or a band not available by the radio terminal UE having a limited available band. For example, a case is assumed in which a radio terminal UE capable of using only an 800 MHz band is located within the service area of the pico base station PeNB #1. If the macro base station MeNB suspends using all component carriers corresponding to the 800 MHz band, since there is a problem that the radio terminal UE is not able to perform handover (or cell reselection) to the macro base station MeNB from the pico base station PeNB #1, it is effective to notify the macro base station MeNB of the information in order to prevent the problem.

Note that the pico base station PeNB #1 is capable of acquiring the aforementioned first information and second information on the basis of communication capability information (UE Capability) that is notified to the pico base station PeNB #1 by the radio terminal UE connected to the pico base station PeNB #1. Alternatively, the pico base station PeNB #1 may acquire the aforementioned first information and second information by performing inquiry for the mobility management device MME or the operation administration and maintenance device OAM.

The third information is information indicating the communication capability of the pico base station PeNB #1. For example, a case is assumed in which component carriers available by the pico base station PeNB #1 are limited to the component carriers CC #1 and CC #2 due to the capability of the pico base station PeNB #1. When the macro base station MeNB is capable of using the component carriers CC #1 to CC #4, since it is preferable that the macro base station MeNB suspends using the component carrier CC #1 and/or CC #2, it is effective to notify the macro base station MeNB of the information.

The fourth information is information indicating a downlink interference level of each component carrier, which is received in the pico base station PeNB #1 from the macro base station MeNB. For example, since it is preferable that the macro base station MeNB suspends using a component carrier that gives large interference to the pico base station PeNB #1 in a downlink, it is effective to notify the macro base station MeNB of the information. Note that the pico base station PeNB #1 is capable of acquiring the aforementioned first information and second information on the basis of radio state information (CQI and the like) that is notified to the pico base station PeNB #1 from the radio terminal UE connected to the pico base station PeNB #1.

In step S12, the pico base station PeNB #2 transmits the information to the macro base station MeNB via the X2 interface, wherein the information is used for determining the component carrier capable of being subject to suspension of use by the macro base station MeNB. The macro base station MeNB receives the information. Furthermore, as the information for determining the component carrier subject to suspension of use by the macro base station MeNB, it is possible to use at least one item of the aforementioned first information to fifth information.

In step S13, the macro base station MeNB performs determination regarding the component carrier capable of being subject to suspension of use. Specifically, the macro base station MeNB determines whether the macro base station MeNB can suspend some component carrier and determines which component carrier is effective to be suspended. On the basis of the aforementioned first information to fifth information, the macro base station MeNB performs determination regarding the component carrier capable of being subject to suspension of use such that a problem due to the suspension of use of the component carrier is avoided and an improvement effect obtained by each of the pico base stations PeNB #1 and PeNB #2 is increased.

In step S14, the macro base station MeNB notifies (broadcasts) the pico base stations PeNB #1 and PeNB #2 of the component carrier capable of being subject to suspension of use, via the X2 interface. The pico base stations PeNB #1 and PeNB #2 receive the notification. In the present embodiment, the notification of the component carrier capable of being subject to suspension of use, is performed by notifying a cell ID of a cell corresponding to the component carrier capable of being subject to suspension of use.

Note that, in the step S14, instead of notifying (broadcasting) the component carrier capable of being subject to suspension of use, a component carrier not capable of being subject to suspension of use, may be notified (broadcasted). Even through the notification (broadcast), the pico base stations PeNB #1 and PeNB #2 are able to recognize the component carrier capable of being subject to suspension of use.

In step S15#1, the pico base station PeNB #1 performs determination regarding a component carrier for which suspension of use should be requested, on the basis of the notification of the component carrier capable of being subject to suspension of use, from the macro base station MeNB and a situation (for example, the aforementioned first information to fifth information) within the service area of the pico base station PeNB #1. In the present embodiment, the pico base station PeNB #1 determines whether to request the suspension of use of the component carrier capable of being subject to suspension of use. The pico base station PeNB #1 performs determination such that a problem due to the suspension of use of the component carrier is avoided and an improvement effect obtained by the pico base station PeNB #1 is increased. Furthermore, it is assumed that the pico base station PeNB #1 has determined to request the suspension of use of the component carrier capable of being subject to suspension of use.

In step S15#2, the pico base station PeNB #2 performs determination regarding a component carrier for which suspension of use should be requested, on the basis of the notification of the component carrier capable of being subject to suspension of use, from the macro base station MeNB and a situation (for example, the aforementioned first information to fifth information) within the service area of the pico base station PeNB #2. In the present embodiment, the pico base station PeNB #2 determines whether to request the suspension of use of the component carrier capable of being subject to suspension of use. The pico base station PeNB #2 performs determination such that a problem due to the suspension of use of the component carrier is avoided and an improvement effect obtained by the pico base station PeNB #2 is increased. Furthermore, it is assumed that the pico base station PeNB #2 has determined not to request the suspension of use of the component carrier capable of being subject to suspension of use.

In step S16, the pico base station PeNB #1 requests the macro base station MeNB to suspend using the component carrier capable of being subject to suspension of use, via the X2 interface. In the present embodiment, the use suspension request of a component carrier is performed by notifying a cell ID of a cell corresponding to a component carrier the suspension of use of which is requested. On the basis of the use suspension request received from the pico base station PeNB #1, it is assumed that the macro base station MeNB has determined to suspend using the component carrier the suspension of use of which is requested.

In step S17, the macro base station MeNB notifies (broadcasts) the pico base stations PeNB #1 and PeNB #2 of the component carrier subject to suspension of use via the X2 interface. The pico base stations PeNB #1 and PeNB #2 receive the notification. In the present embodiment, the notification of the component carrier subject to suspension of use is performed by notifying a cell ID of a cell corresponding to the component carrier subject to suspension of use. The notification may include information (for example, information on how many subframes must pass to suspend the component carrier) indicating a timing at which the suspension of use is executed.

In step S18, the macro base station MeNB performs the suspension of use of the component carrier when a predetermined time lapsed from the notification of the suspension of use (step S17). For example, the macro base station MeNB allows the transmission power of the component carrier to be suspended to be zero. Alternatively, instead of using an elapse of a predetermined time as a suspension condition, it may be possible to employ a suspension condition that a positive response for the notification of the suspension of use has been obtained from each of the pico base stations PeNB #1 and PeNB #2.

The pico base station PeNB (PeNB #1 or PeNB #2) received the notification (step S17) of the suspension of use of the component carrier, for example, may perform at least one of the following first operation or second operation.

According to the first operation, the pico base station PeNB preferentially assigns a resource block, which is included in the component carrier for which the suspension of use has been notified, to a radio terminal UE that supports the carrier aggregation technology among radio terminals UE connected to the pico base station PeNB.

According to the second operation, the pico base station PeNB preferentially performs handover to a cell, which corresponds to the component carrier for which the suspension of use has been notified, to a radio terminal UE that supports no carrier aggregation technology among the radio terminals UE connected to the pico base station PeNB.

Note that in the present operation sequence, the suspension of use of the component carrier is performed (step S18) after the suspension of use of the component carrier is notified (step S17). However, the suspension of use of the component carrier may be performed before the suspension of use of the component carrier is notified or simultaneously to the notification.

Figure 8:
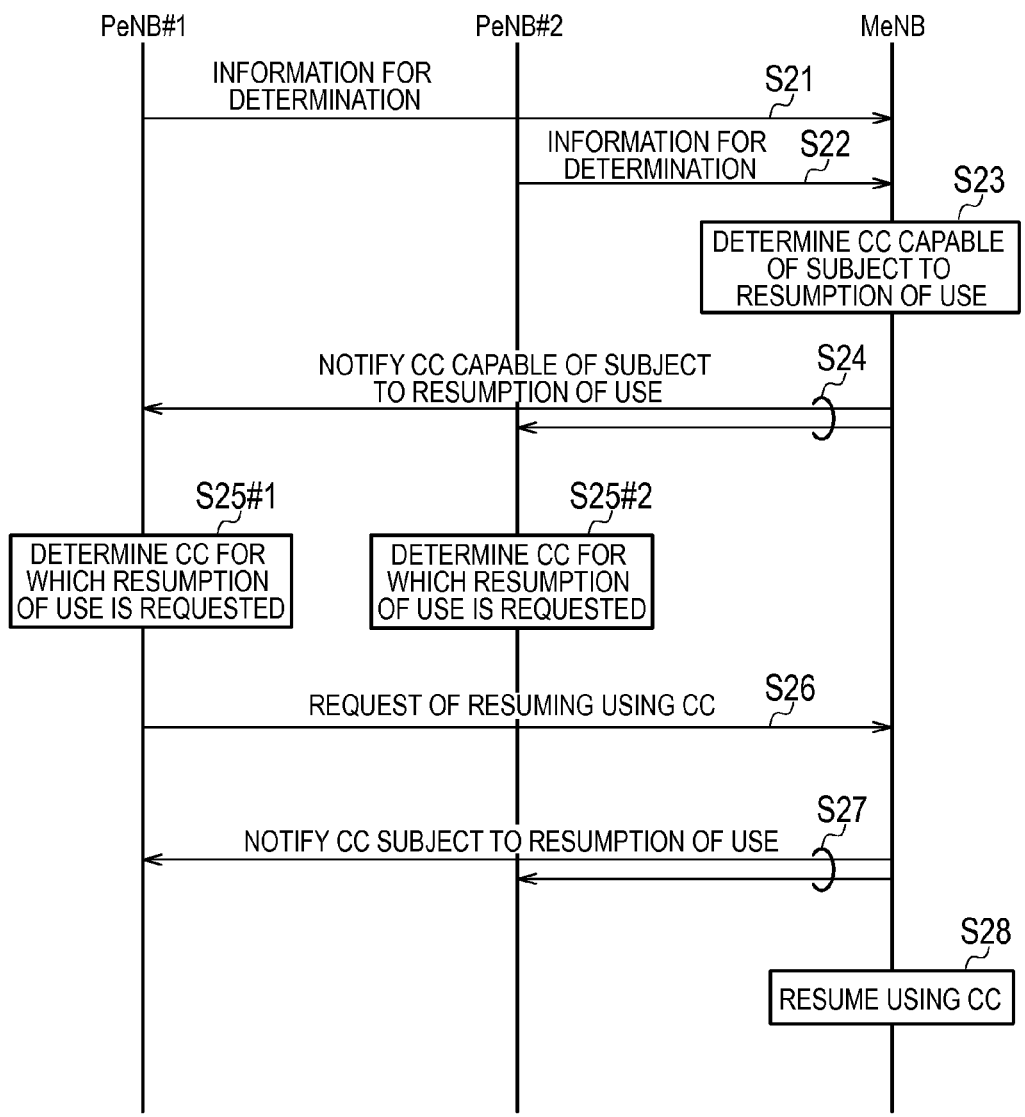
FIG. 8 is an operation sequence diagram of the mobile communication system related to the resumption of use of the component carrier according to the embodiment of the present invention.

Next, an operation sequence of the mobile communication system 1 related to the resumption of use of a component carrier will be described. FIG. 8 is an operation sequence diagram of the mobile communication system 1 related to the resumption of use of the component carrier.

As illustrated in FIG. 8, in step S21, the pico base station PeNB #1 transmits information to the macro base station MeNB via the X2 interface, wherein the information is used for determining a component carrier subject to resumption of use by the macro base station MeNB. The macro base station MeNB receives the information. Furthermore, as the information for determining the component carrier subject to resumption of use by the macro base station MeNB, for example, it is possible to use at least one item of the aforementioned first information to fifth information.

In step S22, the pico base station PeNB #2 transmits the information to the macro base station MeNB via the X2 interface, wherein the information is used for determining the component carrier capable of being subject to resumption of use by the macro base station MeNB. The macro base station MeNB receives the information. Furthermore, as the information for determining the component carrier subject to resumption of use by the macro base station MeNB, it is possible to use at least one item of the aforementioned first information to fifth information.

In step S23, the macro base station MeNB performs determination regarding the component carrier capable of being subject to resumption of use. Specifically, the macro base station MeNB determines whether the macro base station MeNB can resume using some component carrier and determines which component carrier is to be resumed to be used in order to obtain effectiveness. On the basis of the aforementioned first information to fifth information, the macro base station MeNB performs determination regarding the component carrier subject to resumption of use such that a problem due to the resumption of use of the component carrier is avoided.

In step S24, the macro base station MeNB notifies (broadcasts) the pico base stations PeNB #1 and PeNB #2 of the component carrier subject to resumption of use via the X2 interface. The pico base stations PeNB #1 and PeNB #2 receive the notification. In the present embodiment, the notification of the component carrier capable of being subject to resumption of use is performed by notifying a cell ID of a cell corresponding to the component carrier subject to resumption of use.

Note that, in the step S24, instead of notifying (broadcasting) the component carrier capable of being subject to resumption of use, a component carrier not capable of being subject to resumption of use, may be notified (broadcasted). Even through the notification (broadcast), the pico base stations PeNB #1 and PeNB #2 are able to recognize the component carrier capable of being subject to resumption of use.

In step S25#1, the pico base station PeNB #1 performs determination regarding a component carrier for which resumption of use should be requested, on the basis of the notification of the component carrier capable of being subject to resumption of use, from the macro base station MeNB and a situation (for example, the aforementioned first information to fifth information) within the service area of the pico base station PeNB #1. In the present embodiment, the pico base station PeNB #1 determines whether to request the resumption of use of the component carrier capable of being subject to resumption of use. The pico base station PeNB #1 performs determination such that a problem due to the resumption of use of the component carrier is avoided. Furthermore, it is assumed that the pico base station PeNB #1 has determined to request the resumption of use of the component carrier capable of being subject to resumption of use.

In step S25#2, the pico base station PeNB #2 performs determination regarding a component carrier for which resumption of use should be requested, on the basis of the notification of the component carrier capable of being subject to resumption of use, from the macro base station MeNB and a situation (for example, the aforementioned first information to fifth information) within the service area of the pico base station PeNB #2. In the present embodiment, the pico base station PeNB #2 determines whether to request the resumption of use of the component carrier capable of being subject to resumption of use. The pico base station PeNB #2 performs determination such that a problem due to the resumption of use of the component carrier is avoided. Furthermore, it is assumed that the pico base station PeNB #2 has determined not to request the resumption of use of the component carrier capable of being subject to resumption of use.

In step S26, the pico base station PeNB #1 requests the macro base station MeNB to resume using the component carrier capable of being subject to resumption of use, via the X2 interface. In the present embodiment, the use resumption request of a component carrier is performed by notifying a cell ID of a cell corresponding to a component carrier the resumption of use of which is requested. On the basis of the use resumption request received from the pico base station PeNB #1, it is assumed that the macro base station MeNB has determined to resume using the component carrier for which resumption of use should be requested.

In step S27, the macro base station MeNB notifies (broadcasts) the pico base stations PeNB #1 and PeNB #2 of a component carrier subject to resumption of use via the X2 interface. The pico base stations PeNB #1 and PeNB #2 receive the notification. In the present embodiment, the notification of the component carrier subject to resumption of use is performed by notifying a cell ID of a cell corresponding to the component carrier subject to resumption of use. The notification may include information (for example, information on how many subframes must pass to resume using the component carrier) indicating a timing at which the resumption of use is performed.

In step S28, the macro base station MeNB performs the resumption of use of the component carrier when a predetermined time has lapsed after the notification (step S27) of the resumption of use. For example, the macro base station MeNB returns the transmission power of the component carrier subject to resumption to an original level (a standard level). Alternatively, instead of the resumption condition that the predetermined time lapses, it may be possible to employ a resumption condition that a positive response for the notification of the resumption of use is obtained from each of the pico base stations PeNB #1 and PeNB #2.

The pico base station PeNB (PeNB #1 or PeNB #2) which receives the notification (step S27) of the resumption of use of the component carrier may return to a normal state, or for example, may perform at least one of the following first operation and second operation.

According to the first operation, the pico base station PeNB does not assign a resource block, if possible, which is included in the component carrier for which the resumption of use has been notified, to a radio terminal UE that supports the carrier aggregation technology among radio terminals UE connected to the pico base station PeNB.

According to the second operation, the pico base station PeNB preferentially performs handover to another cell from a cell, which corresponds to the component carrier for which the resumption of use has been notified, with respect to a radio terminal UE that supports no carrier aggregation technology among the radio terminals UE connected to the pico base station PeNB.

Note that in the present operation sequence, the resumption of use of the component carrier is performed (step S28) after the resumption of use of the component carrier is notified (step S27), however, the resumption of use of the component carrier may be performed before or at the timing of the notification of the resumption of use of the component carrier.

In the aforementioned operation sequence, the macro base station MeNB suspends or resumes the use of a component carrier. However, the "suspension of use" of FIG. 7 is replaced with "transmission power reduction" and the "resumption of use" of FIG. 8 is replaced with "transmission power increase (or transmission power returning)", so that it is possible to apply the aforementioned operation sequence to the transmission power reduction/increase of the component carrier.

Furthermore, in the aforementioned operation sequence, a parameter for determining the use suspension/resumption of a component carrier may be provided by the operation administration and maintenance device OAM. For example, when the macro base station MeNB determines not to perform the use suspension/the use resumption until the number of received use suspension requests/use resumption requests exceeds a threshold value, the operation administration and maintenance device OAM may set the threshold value in the macro base station MeNB.

Moreover, the present embodiment described the operation sequence in which the use resumption request of a component carrier is transmitted from the pico base station PeNB #1 to the macro base station MeNB. However, instead of such an operation sequence, it may be determined to resume the use of a component carrier when the macro base station MeNB does not receive the use suspension request of the component carrier for a predetermined time.

(2.3) Detailed Example of Inter-Base Station Signaling

Hereinafter, a description will be provided for a detailed example of inter-base station signaling that is used in the aforementioned operation sequence.

Figure 9:
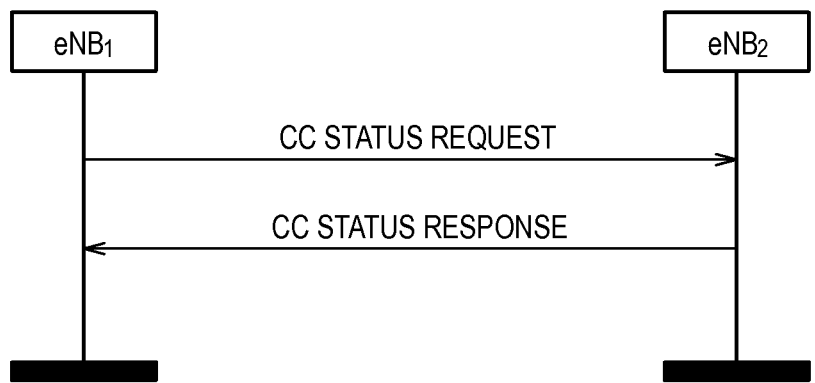
FIG. 9 is a sequence diagram when a positive response is given to a transmission request of the information for determination according to the embodiment of the present invention.
Figure 10:
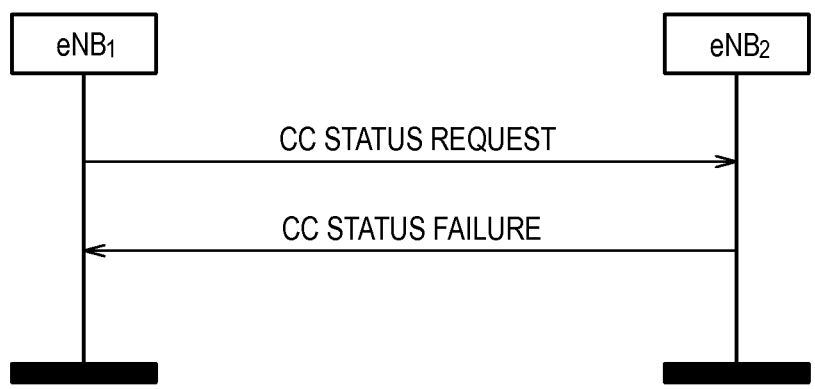
FIG. 10 is a sequence diagram when a negative response is given to the transmission request of the information for determination according to the embodiment of the present invention.
Figure 11:
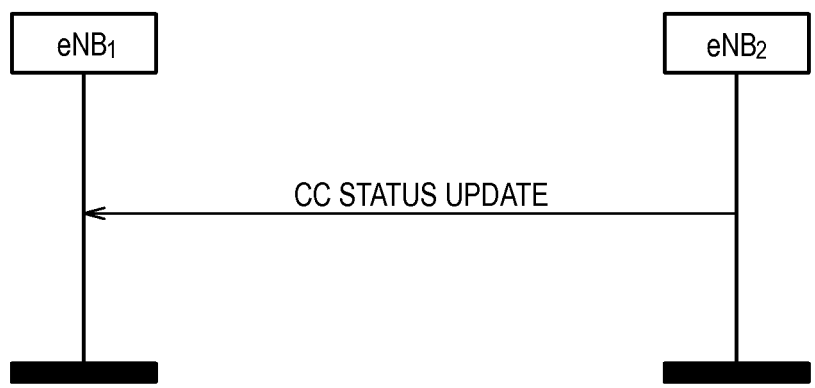
FIG. 11 is a sequence diagram at the time of transmission of the information for determination according to the embodiment of the present invention.

Firstly, with reference to FIG. 9 to FIG. 11, a description will be provided for a detailed example of inter-base station signaling related to the transmission and reception of information (hereinafter, "information for determination") for determining a component subject to suspension of use or a component carrier subject to resumption of use. In FIG. 9 to FIG. 11, eNB 1 corresponds to, for example, the macro base station MeNB and eNB 2 corresponds to, for example, the pico base station PeNB #1 or PeNB #2.

FIG. 9 is a sequence diagram when a positive response is given to a transmission request of the information for determination.

As illustrated in FIG. 9, the eNB 1 transmits CC Status Request, which is a message for requesting a periodic report of the information for determination, to the eNB 2 via the X2 interface. The CC Status Request may include a cell ID for designating a cell, ID of information requested to be reported among the aforementioned first information to fifth information, and information on a time interval at which a report is performed. After the CC Status Request is received, the eNB 2 transmits CC Status Response, which is a positive response message for the CC Status Request, to the eNB 1 via the X2 interface. Note that the CC Status Response may also include at least one item of the aforementioned first information to fourth information.

FIG. 10 is a sequence diagram when a negative response is given to the transmission request of the information for determination.

As illustrated in FIG. 10, the eNB 1 transmits CC Status Request, which is a message for requesting a periodic report of the information for determination, to the eNB 2 via the X2 interface. The CC Status Request may include a cell ID for designating a cell, and ID of information requested to be reported among the aforementioned first information to fifth information. After the CC Status Request is received, the eNB 2 transmits CC Status Failure, which is a negative response message for the CC Status Request, to the eNB 1 via the X2 interface. Note that the CC Status Failure may also include at least one of the aforementioned first information to fourth information.

FIG. 11 is a sequence diagram at the time of transmission of the information for determination. The operation sequence of FIG. 11 is performed after the eNB 2 transmits the CC Status Response. However, the operation sequence is not performed after the eNB 2 transmits the CC Status Failure.

As illustrated in FIG. 11, the eNB 2 transmits CC Status Update, which is a message including the information for determination (the information requested to be reported among the aforementioned first information to fifth information) to the eNB 1 via the X2 interface. Note that a periodic report of the CC Status Update may be continued until the eNB 1 requests the eNB 2 to suspend the periodic report.

Note that the aforementioned sequences of FIG. 9 and FIG. 10 may be omitted, and predetermined type of information may be transmitted from the eNB 2 to the eNB 1.

Figure 12:
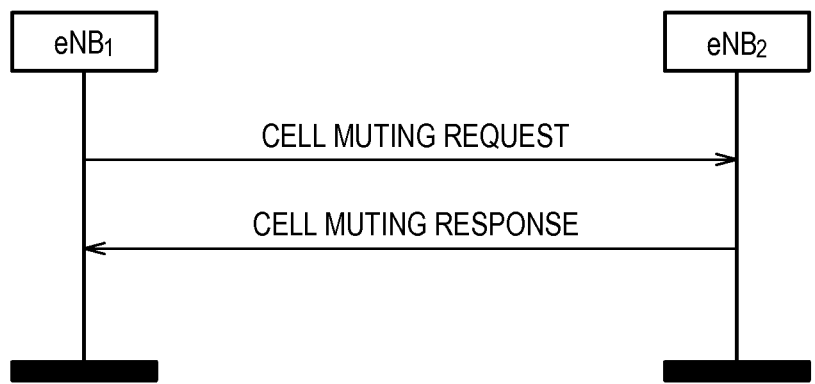
FIG. 12 is a sequence diagram when a positive response is given to the use suspension request of a component carrier according to the embodiment of the present invention.
Figure 13:
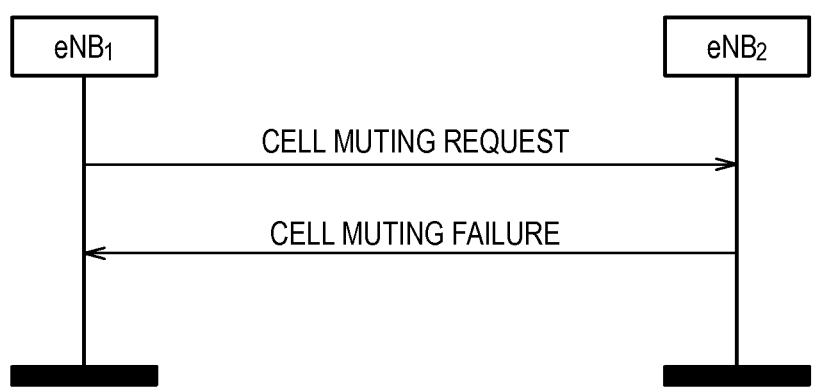
FIG. 13 is a sequence diagram when a negative response is given to the use suspension request of a component carrier according to the embodiment of the present invention.

Next, with reference to FIG. 12 and FIG. 13, a description will be provided for a detailed example of inter-base station signaling related to the use suspension request. In FIG. 12 and FIG. 13, eNB 1, for example, corresponds to the pico base station PeNB #1 or PeNB #2 and eNB 2, for example, corresponds to the macro base station MeNB.

FIG. 12 is a sequence diagram when a positive response is given to the use suspension request of a component carrier.

As illustrated in FIG. 12, the eNB 1 transmits Cell Muting Request, which is a message for requesting the suspension of use of a component carrier, to the eNB 2 via the X2 interface. The Cell Muting Request includes a cell ID of a cell corresponding to a component carrier the suspension of use of which is requested. After the Cell Muting Request is received, the eNB 2 transmits Cell Muting Response, which is a positive response message for the Cell Muting Request, to the eNB 1 via the X2 interface.

Note that, instead of the message for requesting the suspension of use of a component carrier, in the case of using the message for requesting transmission power reduction of the component carrier, a parameter (direct designation or two values of small and large values) for designating a requested transmission power reduction amount (dB by which transmission power is reduced) may be controlled to be included into a message for requesting transmission power reduction and may be transmitted.

FIG. 13 is a sequence diagram when a negative response is given to the use suspension request of a component carrier.

As illustrated in FIG. 13, the eNB 1 transmits Cell Muting Request, which is a message for requesting the suspension of use of a component carrier, to the eNB 2 via the X2 interface. The Cell Muting Request includes a cell ID of a cell corresponding to a component carrier the suspension of use of which is requested. After the Cell Muting Request is received, the eNB 2 transmits Cell Muting Failure, which is a negative response message for the Cell Muting Request, to the eNB 1 via the X2 interface.

Note that, as the use resumption request of a component carrier, Cell Activation Request is available. The Cell Activation Request includes a cell ID of a cell corresponding to a component carrier the resumption of use of which is requested.

Figure 14:
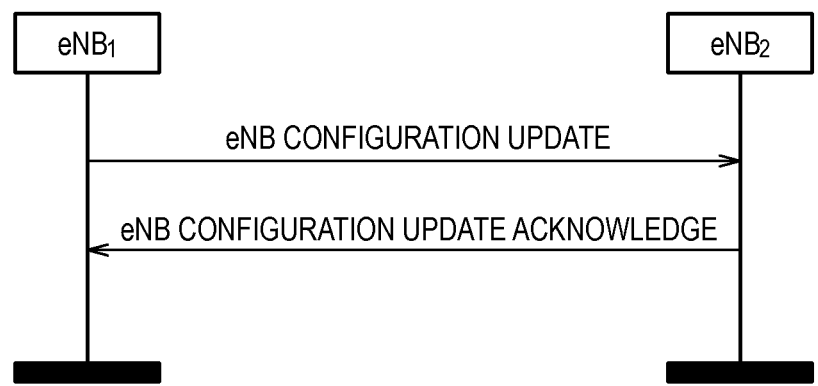
FIG. 14 is a sequence diagram when a positive response is given to the notification of the use suspension/resumption of a component carrier according to the embodiment of the present invention.
Figure 15:
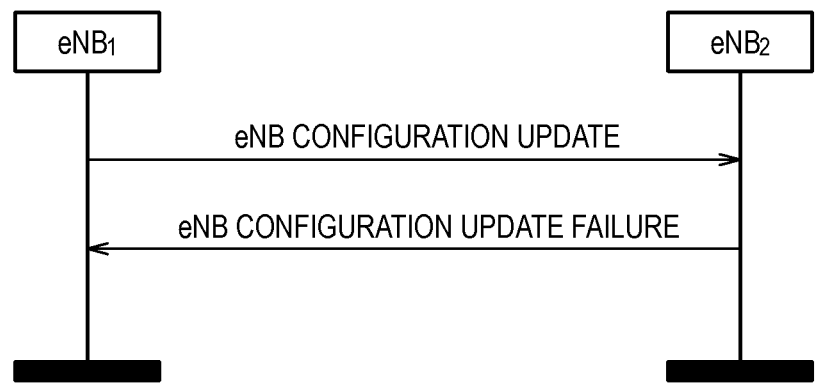
FIG. 15 is a sequence diagram when a negative response is given to the notification of the use suspension/resumption of a component carrier according to the embodiment of the present invention.

Next, with reference to FIG. 14 and FIG. 15, a description will be provided for a detailed example of inter-base station signaling related to the notification of a component carrier subject to suspension of use or the notification of a component carrier subject to resumption of use. In FIG. 14 and FIG. 15, eNB 1 corresponds to, for example, the macro base station MeNB and eNB 2 corresponds to, for example, the pico base station PeNB #1 or PeNB #2.

FIG. 14 is a sequence diagram when a positive response is given to the notification of the use suspension/resumption of a component carrier.

As illustrated in FIG. 14, the eNB 1 transmits eNB Configuration Update, which is a message including information indicating the use suspension/resumption of a component carrier, to the eNB 2 via the X2 interface. The information indicating the suspension of use of a component carrier is, for example, Cell Deactivation Indication IE. The Cell Deactivation Indication IE includes a cell ID corresponding to a component carrier subject to suspension of use. Furthermore, the information indicating the resumption of use of a component carrier is, for example, Cell Activation Indication IE. The Cell Activation Indication IE includes a cell ID corresponding to a component carrier subject to resumption of use. After the eNB Configuration Update is received, the eNB 2 transmits eNB Configuration Update Acknowledge, which is a positive response message for the eNB Configuration Update, to the eNB 1 via the X2 interface.

FIG. 15 is a sequence diagram when a negative response is given to the notification of the use suspension/resumption of a component carrier.

As illustrated in FIG. 15, the eNB 1 transmits eNB configuration Update, which is a message including information indicating the use suspension/resumption of a component carrier, to the eNB 2 via the X2 interface. The information indicating the suspension of use of a component carrier is, for example, Cell Deactivation Indication IE, and the information indicating the suspension of use of a component carrier is, for example, Cell Activation Indication IE.

After the eNB configuration Update is received, the eNB 2 transmits eNB Configuration Update Failure, which is a negative response message for the eNB Configuration Update, to the eNB 1 via the X2 interface. When the eNB Configuration Update Failure is received, the eNB 1 cancels the use suspension/resumption of the component carrier.

Note that in FIG. 14 and FIG. 15, an example, in which the eNB Configuration Update is used, was described. However, the use suspension/resumption of a component carrier may be notified through another message. For example, Cell Type IE included in Last Visited Cell Information of UE History Information may be used and included into a newly defined message.

(3) Effect of Embodiment

As described above, the inter-base station signaling, in which the macro base station MeNB and the pico base stations PeNB (PeNB #1 and PeNB #2) perform the inter-base station interference control in units of component carriers in cooperation with each other, is defined, so that it is possible to avoid a problem due to the suspension of use (or the transmission power reduction) of a component carrier by the macro base station MeNB, and to increase the improvement effect obtained by the suspension of use (or the transmission power reduction) of the component carrier.

Furthermore, the aforementioned operation sequence is periodically performed, so that the macro base station MeNB is capable of adaptively (dynamically) performing the use suspension/resumption (or transmission power reduction/increase) of a component carrier. In this way, it is possible to increase an interference reduction effect and to reduce the power consumption of the macro base station MeNB.

(4) Other Embodiments

As described above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

In the aforementioned embodiment, the macro base station MeNB and the pico base station PeNB exchange various types of information via the X2 interface (on the X2 interface). However, the present invention is not limited to the X2 interface. The macro base station MeNB and the pico base station PeNB may exchange various types of information via an S1 interface (on an X1 interface). For example, it may be possible to employ a configuration in which the aforementioned various types of information (or messages) is transmitted via the mobility management device MME, the operation administration and maintenance device OAM and the like.

The aforementioned embodiment described the case in which the macro base station MeNB performs the use suspension/resumption (or transmission power reduction/increase) of a component carrier. However, the pico base station PeNB may perform the use suspension/resumption (or transmission power reduction/increase) of a component carrier. In this case, it is sufficient if the relation between the macro base station MeNB and the pico base station PeNB in the aforementioned operation sequence is reversed.

Furthermore, the aforementioned embodiment mainly described signaling between different types of base stations in the heterogeneous network. However, since inter-base station interference may also occur between the macro base stations or between the pico base stations, the present invention may also be applied to signaling between the same type of base stations.

Note that, in LTE Advanced, since it is expected that a relay node that is a base station that configures a backhaul in radio is employed and that the X2 interface is also employed for the relay node, the relay node may be employed as the base station according to the present invention.

Furthermore, in the future, it is considered that one component carrier is divided and each divided carrier is dealt as a new component carrier. Accordingly, the term "component carrier" in the present specification is assumed to include such a new component carrier.

Accordingly, it must be understood that the present invention includes various embodiments and the like that are not described herein.

The entire content of Japanese Patent Application No. 2011-098824 (filed on Apr. 26, 2011) is incorporated herein by reference.

INDUSTRIAL APPLICABILITY

As described above, since a base station and a control method thereof according to the present invention are able to reduce interference in a carrier aggregation technology, they are applicable to a radio communication field such as mobile communication.

The invention claimed is:

1. A base station in a mobile communication system, comprising:
   a controller including at least one processor, the controller configured to cause the base station to:
   communicate with a radio terminal wirelessly connected to the base station;
   receive, from the radio terminal, a capability message indicating a communication capability of the radio terminal, wherein the capability message includes support band information of a range of frequencies at which the radio terminal is capable of using for radio communications;
   receive, from the radio terminal, a measurement message including measurement information indicating downlink measurement results performed by the radio terminal, wherein the measurement message is different message from the capability message;
   transfer the support band information and the measurement information by a single message to another base station via a network interface, wherein the support band information and the measurement information are used for determining, by the another base station, at least one cell to be added among plural cells of the another base station;
   receive message on a result of determination related to the at least one cell to be added in the another base station, from the another base station via the network interface, wherein the result of determination is based on the support band information and the measurement information; and
   after receiving the message on the result of the determination from the another base station, continue communication between the base station and the radio terminal even when the at least one cell of the another base station is added.

2. A method performed at a base station of a mobile communication system, comprising:
   communicating with a radio terminal wirelessly connected to the base station;
   receiving, from the radio terminal, a capability message indicating a communication capability of the radio terminal, wherein the capability message includes support band information of a range of frequencies at which the radio terminal is capable of using for radio communications;
   receiving, from the radio terminal, a measurement message including measurement information indicating downlink measurement results performed by the radio terminal, wherein the measurement message is different message from the capability message;
   transferring the support band information and the measurement information by a single message to another base station via a network interface, wherein the support band information and the measurement information are used for determining, by the another base station, at least one cell to be added among plural cells of the another base station;
   receiving message on a result of determination related to the at least one cell to be added in the another base station, from the another base station via the network interface, wherein the result of determination is based on the support band information and the measurement message; and
   after receiving the information on the result of the determination from the another base station, continuing communication between the base station and the radio terminal even when the at least one cell of the another base station is added.

* * * * *